INVENTOR.
Burton P. Franklin

Nov. 30, 1965     B. P. FRANKLIN     3,221,192
VARIABLE SPEED HAND TOOL
Filed Oct. 11, 1962     3 Sheets-Sheet 3
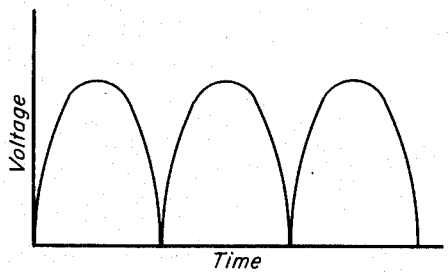
Fig. 8
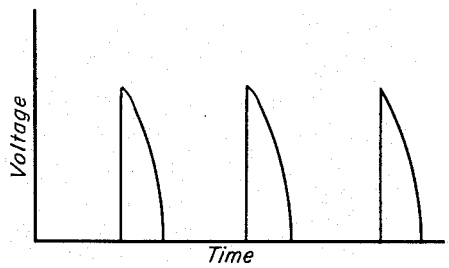
Fig. 9
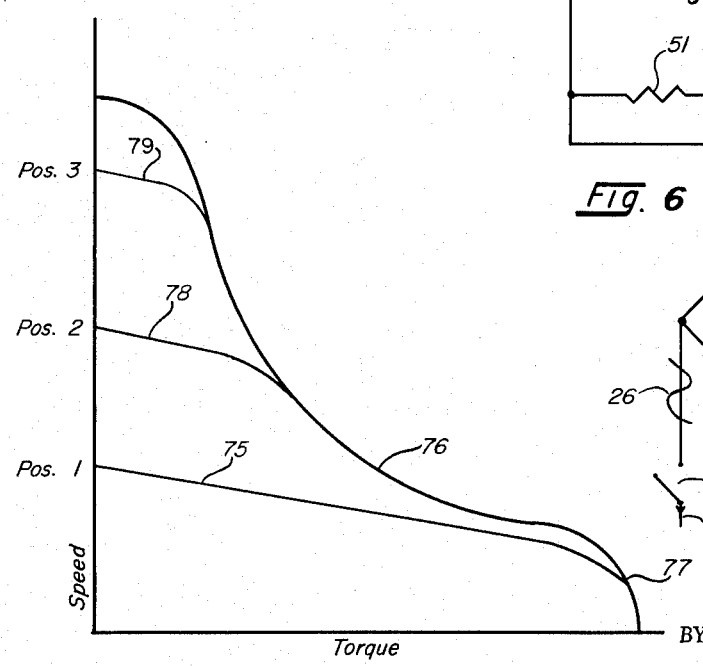
Fig. 7
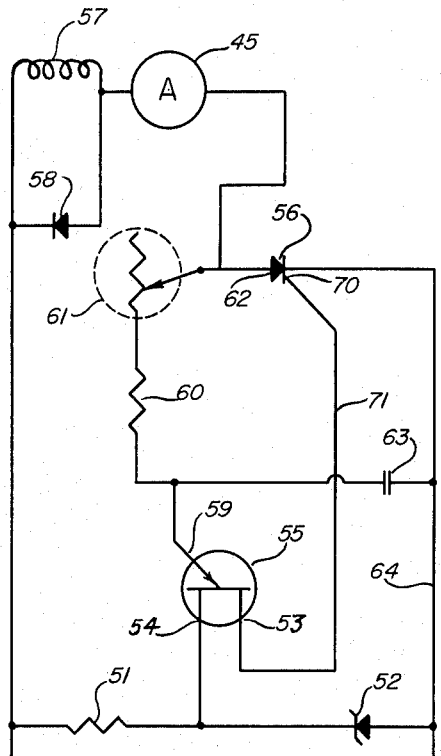
Fig. 6
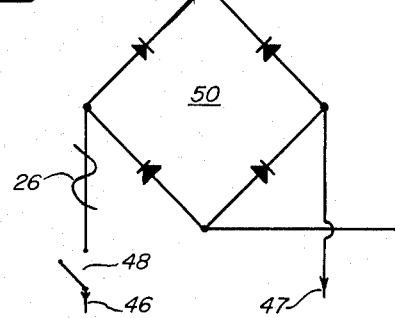
INVENTOR.
Burton P. Franklin
BY
*B. B. Olive*
ATTORNEY United States Patent Office 3,221,192
Patented Nov. 30, 1965

3,221,192
VARIABLE SPEED HAND TOOL
Burton P. Franklin, Danville, Va., assignor to H. K. Porter Company (Delaware), Danville, Va., a corporation of Delaware
Filed Oct. 11, 1962, Ser. No. 229,876
2 Claims. (Cl. 310—68)

This invention relates to a new and improved electrically powered, variable speed hand tool which is generally adapted to being used in portable electric hand drills, saws, sanders and the like.

Portable electric hand tools have not heretofore employed a built-in electric speed control system which permits the tool to maintain a satisfactory efficiency and be adjusted to any desired speed within the speed range of the motor driving the tool. It can also be observed that portable electric hand tools have not heretofore employed a built-in electric speed control system which permits the speed of the tool to be easily changed while the tool remains in operation and with fingers of the same hand that is being employed to hold the tool and operate the on-off switch.

Speed control in some tools has been achieved by having a separate electric speed control unit, not built into the tool itself, through which power is fed to the tool. Other tools have had a built-in electric speed control system limited to a relatively small number of speed designations, usually a low and high speed. Still another approach has been to employ a built-in mechanical speed control such as a governor or gear shift type mechanism. All such speed controls whether mechanical or electrical have generally provided substantially unstable speed control in the sense that the speed selected could be maintained only within some narrow variation in load. Prior electric speed controls are also characterized by various unsatisfactory power and heat dissipation problems. The control element, in particular, has generally carried the full load current and has dissipated substantial heat which has meant that it had to be thermally isolated from the handle.

The general object of this invention is therefore to provide an electric hand tool adapted for use in electric drills, saws, sanders and the like and having an improved built-in speed control system.

Another object is to provide such an electric hand tool in which a given operating speed can be manually selected from a wide range of speeds while the tool remains in operation and the selected speed thereafter maintained between relatively wide load variations.

Another object is to provide such an electric hand tool in which a given operating and relatively stable speed can be manually selected from a wide range of speeds while the tool remains in operation and with fingers of the same hand that holds the tool.

Another object is to provide such an electric hand tool in which the working element, whether drill, saw blade, sander belt or the like, can vary substantially in size and loading characteristic and the element employed with wide ranges of materials such as soft and hard woods, soft and hard metals, soft and hard plastics and the like.

Another object is to provide such an electric hand tool in which there is a built-in electric speed control having a relatively low heat dissipating control element accessible to fingers of the same hand that holds the tool and operates its on-off switch.

Another object is to provide such an electric hand tool in which there is a built-in speed control circuit and the heat dissipating elements of the circuit are arranged to receive maximum cooling effect when the tool is in operation.

A further object is to provide such an electric hand tool in which there is an independently positionable electric speed control element and an independently positionable on-off switch accessible to fingers of the same hand such that the operations of changing from one relatively stable speed to another relatively stable speed and cutting the power on and off may be performed independently of each other but with fingers of the same hand.

These and other objects of the invention will appear from the description and drawings, in which the invention is shown, as an example, embodied in a portable electric hand drill. In the drawings:

FIGURE 6 is a circuit diagram of the electric circuit employed.

FIGURE 7 is a diagram of the speed-torque characteristics of the electric motor employed.

FIGURE 8 is a diagram of a fully rectified alternating voltage wave as produced by the rectifier section of the motor circuit.

FIGURE 9 is a diagram of a partially rectified, or chopped, alternating voltage wave as may be applied to the motor itself.

Figure 1:
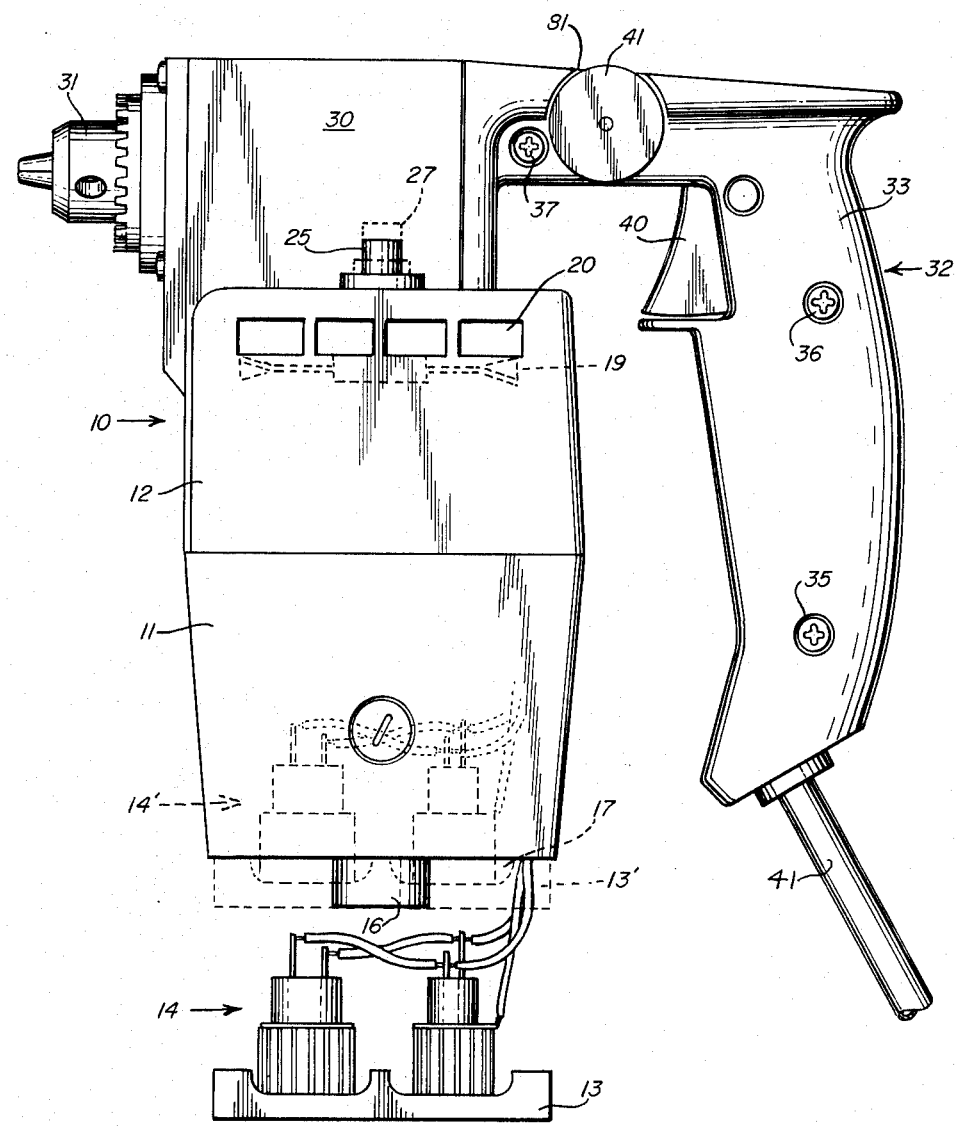
FIGURE 1 is a side elevation of the drill with the lower part of the casing removed for purposes of illustration.

As previously mentioned, the invention is generally applicable to electric hand tools such as electric drills, saws, sanders and the like. For purposes of illustration, the invention is shown embodied in an electric hand drill generally of the type previously sold by H. K. Porter Company, Inc. of Pittsburgh, Pennsylvania and designated in the trade as a "Dirk" D–25 drill. It is believed to furnish an excellent example of the invention's application and the description to follow refers to this embodiment though it is to be understood that the invention is generally applicable to electric hand tools of the kind previously mentioned.

It has been known for some time that the fractional horsepower universal motor has speed torque characteristics useful for electric hand tools and such motors have been employed in electric hand tools to drive the working element such as a drill. It has also been known to regulate the speed of a universal motor in one method by a rheostat in series with the motor, in a second method by diverting current around the armature and in a third method by using a silicon controlled rectifier between the series motor field and armature. Such speed control circuits however involve either power and heat dissipation problems, non-standard wiring arrangements of the field or special rectifier limitations.

While the universal motor itself has met the needed fractional horsepower motor characteristics, the need for an associated control circuit of satisfactory characteristics and the need for a fully satisfactory physical arrangement of the control circuit elements have remained as needs to be met in an improved electric hand tool. In the present invention, it is believed that the ideal combination of motor, control circuit and physical arrangement have been provided in a combination which meets all of the objectives previously set forth. Such an ideal combination is achieved by employing the universal motor in combinataion with a modern feedback, preferably solid-state, control circuit that enables a given speed to be set and maintained relatively constant even though load varies substantially. The combination of the invention furthermore employs a speed control of low heat dissipation and that is located in the handle itself immediately adjacent the on-off switch. The other heat dissipating elements are located so as to receive maximum cooling effect when the tool is in operation.

As will be seen from the description to follow, a silicon controlled rectifier and unijunction transistor control type circuit is found to have the characteristics desired. The control element of this circuit is mounted in the tool handle near the on-off switch so that with fingers of one hand, relatively stable speed can be regulated over a wide range, the tool can be held and power can be cut on and off. The remaining heat dissipating elements of the circuit are arranged to contact the air that is drawn into the tool before such air contacts any other heat dissipating parts of the tool and in this way added life is given to the solid-state elements of the circuit. The control circuit chosen while not, per se, forming part of this invention furnishes the characteristic of sensing the load at any given speed setting and, within limits, furnishing extra power when needed to offset increase load and maintain the speed setting and furnishing less power when the load is reduced. Of particular importance to the present invention is the fact that the control circuit employed may be regulated by a manually variable and relatively low heat dissipating unit. The description will now turn to a more detailed description of how this circuit is arranged and utilized in the invention as embodied in the hand electric drill being used for illustration.

The casing of the drill generally represented by 10 includes a lower motor casing 11 and upper motor casing 12 housing a vertically mounted universal motor, not shown. Lower casing 11 is closed at the bottom by a plate 13 on which are rigidly mounted the principal solid-state components of the control circuit, such components being generally represented at 14. Plate 13 is in turn arranged to be positioned on lower casing 11, as at 13′, by means of the screw 15 which is received by and extends through plate 13 and engages threaded post 16. In the mentioned position, the components 14 are thus arranged as at 14′ so as to be in lower casing 11 and in the path of the air intake openings 17 and 18 through which fresh air is constantly drawn by the motor mounted conventional fan 19, indicated in dotted lines, the air being exhausted through the exhaust openings 20 and 21. Since a universal motor is generally able to accept sustained heat rise, within well known limits, without damage, the described arrangement insures that the generally more heat sensitive solid-state elements will receive maximum cooling effect. However, to further insure protection against overloading and overheating of the circuit elements there is provided a conventional thermal overload reset switch indicated at 25 in FIGURES 1 and 2 and at 26 in FIGURE 6 and which rises to the dotted line position 27 upon sustaining an overload.

Figure 2:
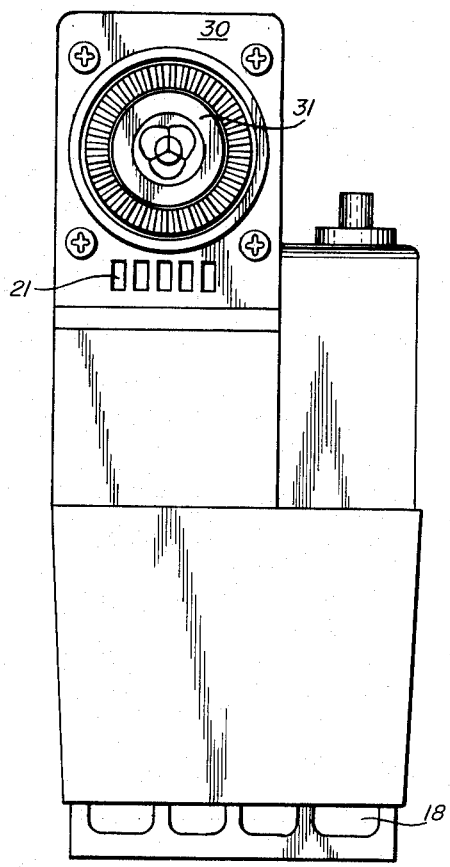
FIGURE 2 is a front elevation of the drill.
Figure 3:
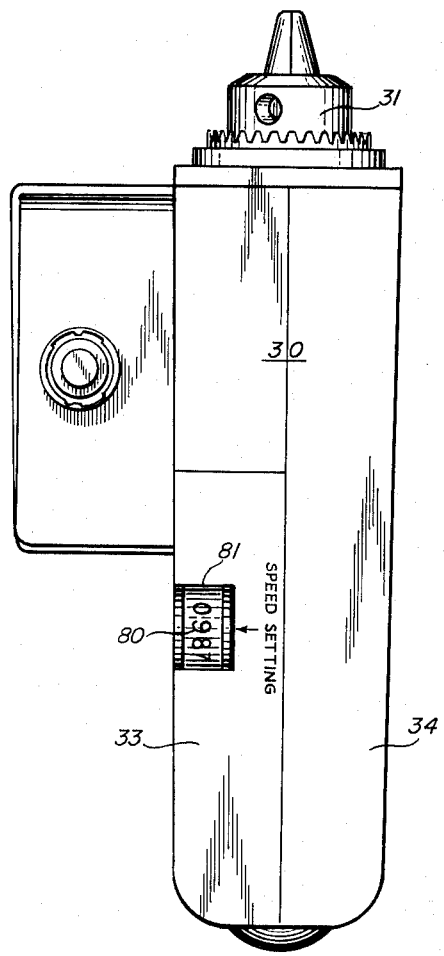
FIGURE 3 is a top plan view of the drill.
Figure 4:
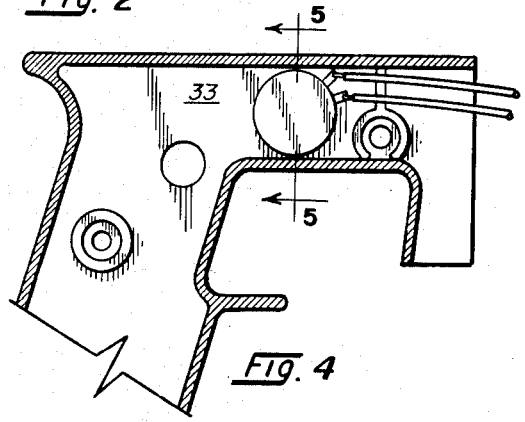
FIGURE 4 is a fragmentary elevation of a portion of the drill handle.
Figure 5:
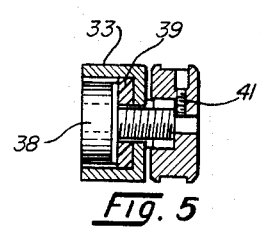
FIGURE 5 is a sectional view taken on line 5—5 of FIGURE 4.

The upper portion of casing 10 forms a gear box generally indicated at 30 in which are housed the reducing gears, not shown, which drive the chuck 31. The handle, generally indicated at 32, includes two integrally connected elements, namely, an integral casting 33 and an integral casting 34 arranged as best shown in FIGURES 1 and 3 and which are held together by the screws 35, 36, 37. Handle 32 is fixed to the casing 10 and mounts the conventional on-off trigger switch 40 such that it can be operated by the fore-finger of the hand which holds the grip portion of handle 32. Of particular interest to the present invention is the fact that handle 32 also mounts a rotatable knob element 41 which as later seen controls the variable resistor control element 61 (FIGURE 6) for regulating the speed of the drill. The case 38 holding resistor 61 is mounted by a suitable epoxy agent 39 so as to be retained in casting 33 as shown in FIGURE 5. As also brought out later in the description, the variable resistor 61 controlled by knob element 41 passes only a very small portion of the power consumed by the tool which enables the resistor element 61 to be located near the hand that is holding the drill. For the same reason, the control knob 41 which controls the resistor element 61 can be located near the hand that is holding the drill without danger of excess heat affecting the hand. Thus, both control knob 41 and on-off switch 40 are controllable by fingers of the same hand that holds the drill which means from the viewpoint of practical application that not only can the circuit be cut on and off while the tool is in operation but the speed can also be varied between relatively stable positions while the tool is in operation and both operations can be independently performed by fingers of the same hand. While the exact arrangement may vary, in the arrangement shown the on-off switch 40 is conveniently operated by the forefinger and the speed control element 41 by the thumb. To complete this part of the description, power is fed to the drill through the service wire 41 which can be connected and disconnected to the circuit by means of the switch 40 which is provided with the usual holding button 42 that enables the switch to be held in on position.

The description now turns to FIGURES 6 through 9 and a description of the circuit employed in carrying out the invention. As previously mentioned, the motor employed in carrying out the invention is a universal A.C.-D.C. motor, the armature of which is represented at 45 by the designattion "A." The incoming wires 46, 47 make up the previously referred to service wire 41 which feeds power through the previously mentioned on-off switch, designated 48 in FIGURE 6, and also through the previously mentioned thermal overload switch 26.

The circuit is adapted to be operated from a 116 volt, 60 cycle source. At the input of the circuit, the full wave bridge rectifier 50 rectifies the input sinusoid and gives a voltage wave having 120 positive pulses a second. A resistor 51 and a zener diode 52 are connected in series across the supply source and function to limit the potential difference between base I indicated at 53 and base II indicated at 54 of unijunction transistor 55 to a desired amount. A further series circuit is comprised of silicon controlled rectifier 56, armature 45 and the motor field 57. It will be noticed that this last mentioned circuit is in parallel with the series circuit formed by resistor 51 and zener diode 52 and is also connected across the power source. It will be apparent that when the silicon controlled rectifier 56 is in a conducting state, the source voltage is applied across the series circuit which includes the armature field 57, the armature 45 and the silicon controlled rectifier 56.

Looking at the remainder of the circuit, a diode 58 is connected in parallel with field 57. Diode 58 provides a circulating path for field 57 when silicon controlled rectifier 56 is cut off and thus eliminates any tendency for the collapsing field to prevent cut-off. The emitter 59 of the unijunction transistor 55 is connected in series with a fixed resistor 60 and variable resistor 61, variable resistor 61 which is controlled by the previously mentioned control knob 41 connects to the circuit between the anode 62 of silicon controlled rectifier 55 and armature 45. A charging capacitor 63 has one side connected between emitter 59 and fixed resistor 60 and the other side to the reference ground wire 64. Resistors 60 and 61 are both of high ohmic value.

At the beginning of each one-half cycle of the voltage pulse, the silicon controlled rectifier 56 is in a non-conductive state. To render the silicon controlled rectifier 56 conductive, its gate 70 must be closed. This can be accomplished by firing the unijunction transistor 55. To fire the unijunction transistor 55, the emitter 59 must reach its peak point voltage or driving voltage which is a percent of the voltage applied across base I, 53, and base II, 54. To reach this peak point voltage which will cause the unijunction transistor 55 to fire, the capacitor 63 stores the voltage positively on its upper plate and when the value of the peak point voltage is reached, the emitter 59 fires and sends a pulse through connecting wire 71 which closes the gate 70 of the silicon controlled rectifier 56 and renders it conductive.

After the silicon controlled rectifier 56 is in a conductive state, the voltage is directly applied to the silicon controlled rectifier 56 without having to be applied to the variable resistor 61; the resistor 60 and the emitter 59, since the resistance in the silicon controlled rectifier 56 is negligible as compared to the resistance in the resistor 60. The voltage continues to be applied in this manner until the value of the one-half cycle reaches zero, at which time the gate 70 of the silicon controlled rectifier 56 opens and the field current is diverted through diode 58. Therefore, once the silicon controlled rectifier 56 is rendered conductive, the armature 45 consumes practically all of the voltage applied thereto for the production of rotation.

After the one-half cycle reaches a zero value and the circuit is open, the armature continues to spin resulting in the production of a residual back E.M.F. which is applied to the circuit and which is proportional to the speed of the armature and the residual flux density. This residual back E.M.F. is applied to the capacitor 63 and charges its upper plate negatively. Therefore, at the beginning of the next one-half cycle and in order to fire the unijunction transistor 55, the capacitor 63 must be positively charged an amount equal to the negative charge on its upper plate plus the peak point value. This feedback feature becomes important when the motor is operating at less than full speed.

If the variable resistor 61 has been turned to permit an armature rotation of approximately one-third speed, the voltage pulse as illustrated by FIGURE 9 will have a chopped effect. Time is the important factor for as the resistance of variable resistor 61 is increased, the capacitor 63 requirse a longer time to store the voltage which will fire the unijunction transistor 55. Since unijunction transistor 55 is fired later in the one-half cycle, silicon controlled rectifier 56 is in a conductive state for a smaller portion of the one-half cycle, therefore, the motor has less voltage to produce speed in armature 45. By employing this unique circuit, the motor does not dissipate voltage in resistors and therefore, no power is wasted when the motor is operating at less than full speed.

FIGURE 9 represents the chopped, rectified input voltage curve when the motor is running at approximately one-third speed. This curve corresponds to position 1 in FIGURE 7 when the motor is operating under no load. Following the relatively flat curve 75 at position 1 in FIGURE 7 from the no load position, as the load is applied to the motor, the torque increases to meet the load without appreciably reducing motor speed until curve 75 reaches the bounds of the characteristic speed-torque curve 76 of the motor. After the two curves have merged as at 77, the speed will be reduced as the load is increased as in any standard motor without this circuit and the motor consumes the total available voltage, the voltage wave appearing as that in FIGURE 8. From this explanation, it will be seen that the curves 78, 79 of FIGURE 7 corresponding to the other two positions illustrated have a much shorter torque range since most of the voltage is consumed in producing rotation.

While only three knob positions are illustrated in FIGURE 7 it will be understood that a relatively infinite number of knob positions may be employed. By printing indicia on the knob element 41 corresponding to various speed positions as at 80, the operator may quickly select a particular relatively stable speed or change from one relatively stable speed to another relatively stable speed and this selection may be accomplished while the tool remains in operation and with a finger of the hand that is holding the tool. A particularly convenient arrangement is provided by having a slotted aperture as at 81 in the handle where the control knob 41 is mounted so that respective position numbers will show through the handle aperture as the control knob is turned.

The motor speed once selected by positioning knob 41 remains relatively constant due to the unique feedback feature of this circuit. As a load is applied to the motor which instantaneously reduces armature speed, the residual back E.M.F. decreases since it is a function of armature speed, therefore, the negative charge which is stored on the top plate of the capacitor 63 is also proportionally reduced. When the next one-half voltage cycle is applied to the circuit, the positive charge on the upper plate of capacitor 63 reaches the peak point voltage in a shorter time thus firing the unijunction transistor 55 earlier in the one-half cycle. Since a pulse from the unijunction transistor 55 renders the silicon controlled rectifier 56 conductive earlier in the cycle, more voltage becomes available for consumption by the motor and this extra amount is used in maintaining armature rotation at the predetermined speed.

As the load applied to the motor decreases, the above mentioned process reverses itself. The residual back E.M.F. increases with the increasing armature speed causing the unijunction transistor 55 to fire later which causes the silicon controlled rectifier 56 to remain in a non-conductive state for a greater portion of the one-half cycle with the end result being that a reduced amount of voltage is available for consumption by the motor for the production of armature speed.

From the description given it will be seen that by employing a universal motor with the type of control circuit described and physically arranging the circuit elements and particularly the low heat dissipating control element as described, the invention provides an electric hand tool that is extremely practical in operation. In applying the invention to the "Dirk" D-25 drill previously mentioned, for example, it is found that drill size may vary from $\frac{1}{16}$ inch, speed may vary from 600 r.p.m. to 2000 r.p.m. and the materials drilled may vary from brass to tool steel. Of particular importance to this invention is the ease and convenience afforded by the invention in meeting such a versatile work load situation.

This invention is, of course, not limited to the specific constructional details as disclosed but many changes, modifications and variations may be resorted to without departing from the spirit of the invention as now set forth in the claims.

What is claimed is:

1. In a variable speed portable electric hand tool having a casing, a handle fixed to said casing including a pistol type hand grip portion, a drive motor mounted in said casing, a service wire connected to said tool and providing an alternating voltage source, a pivoted on-off switch for said source mounted in said hand grip portion and adapted to index finger operation, a substantially constant speed control circuit mounted in said casing and having a rotatable speed control element therefor, means for regulating said element comprising a knob, said knob being recessed in the side of said handle and occupying a position when said handle is vertical which is above, slightly forward and to the side of said switch and arranged for rotation in a plane which is substantially parallel to the plane of operation of said switch, means securing said knob to said element, the energization and speed of said motor thereby being respectively independently and simultaneously controlled with said index finger and thumb of one hand holding said grip portion.

2. In a variable speed portable electric hand tool as claimed in claim 1 wherein said knob is provided with consecutively printed indicia corresponding to various speeds and a portion of said handle mounting said knob includes an apertures through which said indicia are consecutively exposed as said knob is turned.

References Cited by the Examiner
UNITED STATES PATENTS

| | | | |
|---|---|---|---|
| 2,939,064 | 5/1960 | Momberg et al. | 318—246 |
| 3,085,169 | 4/1963 | Abel | 310—50 |
| 3,095,534 | 6/1963 | Cockrell | 321—19 |
| 3,146,392 | 9/1964 | Sylvan | 323—22 |

ORIS L. RADER, *Primary Examiner.*

MILTON O. HIRSHFIELD, *Examiner.*

A. J. ROSSI, *Assistant Examiner.*